INVENTORS.
ALFRED J. KLOSE
RICHARD V. HENRY
BY
ATTORNEYS.

United States Patent Office 3,114,381
Patented Dec. 17, 1963

3,114,381
LIQUID LEVEL CONTROL APPARATUS FOR CONTROLLING INDEPENDENTLY OF GRAVITY AND DENSITY
Alfred J. Klose, Rolling Hills, and Richard V. Henry, Pasadena, Calif., assignors to Wallace O. Leonard, Inc., Pasadena, Calif., a corporation of California
Filed Sept. 19, 1960, Ser. No. 56,950
2 Claims. (Cl. 137—101.25)

This invention relates to the determination of the relative quantities of at least two liquids present in separate containers, and finds particular application in the control of liquid propellants used to power rocket engines.

At the present time, many rocket engines are powered by a liquid fuel which is mixed and burned with a liquid oxidizer, such as liquid oxygen. The liquid fuel and oxygen are stored in separate tanks, and the amount of liquid in each tank is determined by the intended mission of the rocket engine. When the engine is used as a missile, both the fuel and oxygen should be depleted simultaneously to provide minimum dead weight at burn-out for maximum missile range. In other words, the ratio of the mass of liquid oxygen to the mass of liquid fuel should be constant throughout the operation of the rocket engine for maximum range.

Prior to this invention, simultaneous depletion of the fuel and oxidizer has been based largely upon proper missile tanking accuracy and inherent accuracy of the engine consumption rates of the fuel and oxidizer, and, as a secondary means of correcting for tanking errors or engine consumption rate inaccuracies, in-flight propellant utilization equipment to meter the consumption rate of the fuel and/or oxidizer. The in-flight propellant utilization equipment used prior to this invention has been limited in scope to simple cylindrical tanks or, for more complicated tank shapes, has had inherent system inaccuracies based on the predicted rate of propellant consumption. As a consequence, there has often been an excess of either fuel or oxygen at burn-out resulting in reduced range of the missile.

Measurement of the unconsumed liquid oxygen and fuel in flight to control the operation of the rocket engine is complicated by changes in liquid density due to temperature variations, or fluctuations in gravitational force due to acceleration. Both of these parameters vary over a wide range during the flight of a missile.

This invention provides a system which senses the relative amounts of the two liquids stored in separate tanks to minimize the effects of gravity or acceleration and density. One valuable application of such information is to provide positive control of the relative rates at which liquid oxygen and fuel are supplied to a rocket engine so that both liquids are simultaneously depleted at burn-out.

Briefly, the invention contemplates a system which includes first and second tanks each adapted to hold first and second liquids, respectively, such as liquid fuel and liquid oxygen. Means are provided for sensing the pressure head of each liquid in each tank, and means are provided for detecting the ratio of the two liquid pressure heads as a measure of the relative quantity of liquid in each tank. By measuring the ratio of the liquid heads, missile acceleration cancels out, and the ratio should remain constant, if the tanks are of uniform cross section and the liquid densities remain constant.

Unfortunately, in many cases the tanks in missiles are not of uniform cross section and have irregular end shapes, causing the volume in the tanks to vary as a non-linear function of liquid height. Thus, often the ratio of the pressure heads in the liquids cannot be relied on to maintain the desired ratio of amounts of liquids in the tanks.

Instead, it is preferable to calibrate the tanks to determine how the volume of liquid in the tanks varies with liquid height, and use this information to determine the amount of liquid remaining in at least one of the tanks by detecting the height of the liquid in the tank. By knowing the volume of liquid remaining in one of the tanks, the desired ratio of the pressure in that tank to the pressure in the other tank is established. For this reason, the preferred embodiment of the invention also includes means for generating a control or command signal which is a function of the liquid head in at least one of the tanks to dictate what the ratio of the two liquid pressure heads should be. Means are also provided for comparing the control signal with the actual ratio of the two pressure heads to develop an error or correction signal, which is used to regulate the flow of one or both of the liquids to provide the desired ratio of the liquids in their respective tanks. This provides positive compensation for irregularities in the shapes of the tanks, and for variations in expected liquid flow rates from the tanks.

These and other aspects of the invention will be more fully understood from the following description, in which.

Figure 1:
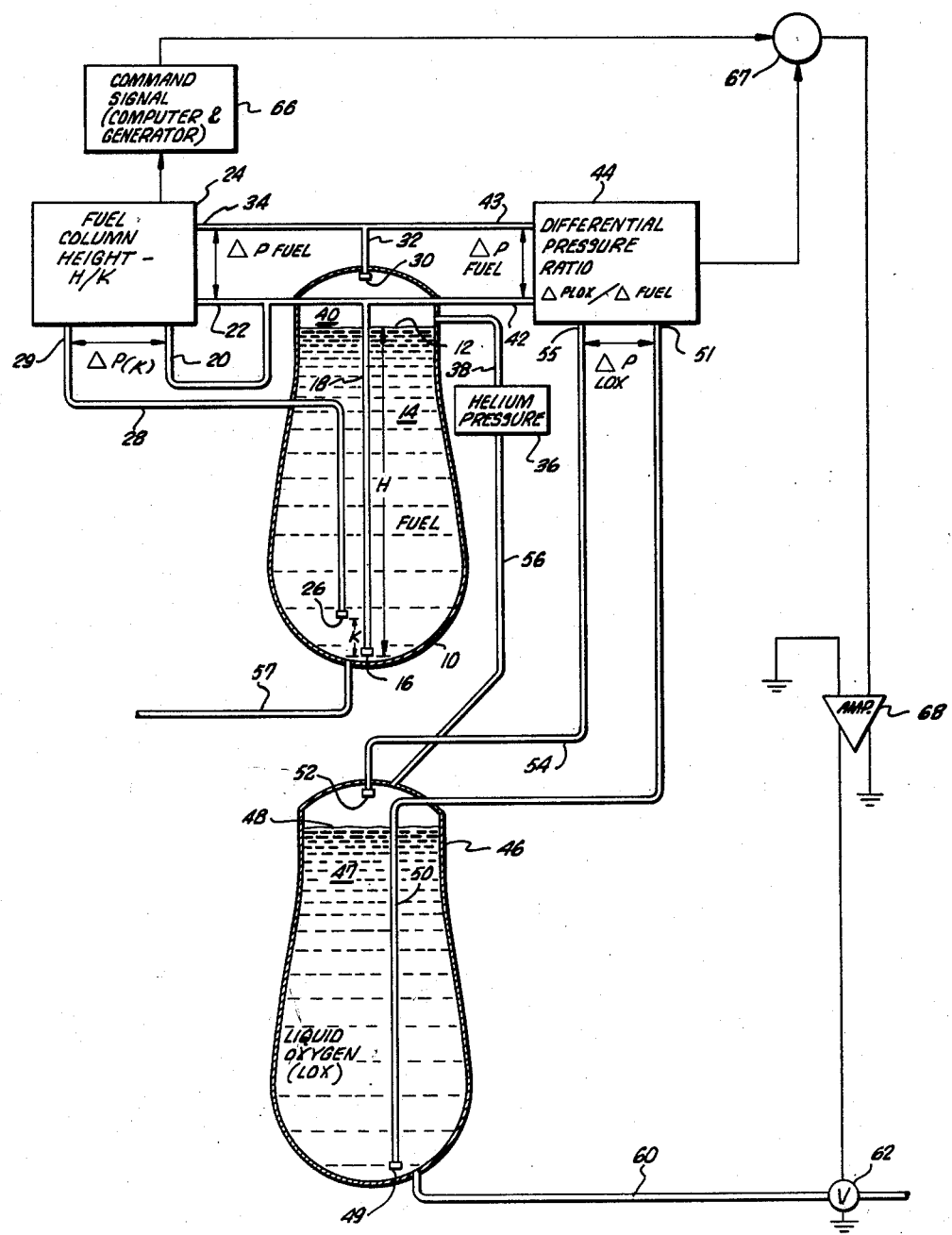
FIG. 1 is a schematic diagram of one form of the invention.

Referring to FIG. 1, a conventional missile fuel tank 10 is mounted on a misslie (not shown) and filled to an operating level 12 with a propellant fuel 14 to a height H above a first pressure-sensing pickup 16, which is connected through a line 18 to a pair of inputs 20, 22 of a force balance instrument 24 which senses differential pressure ratio. A second pressure sensing pickup 26 is mounted a height K above the first pickup and is connected by a line 28 to an input 29 of the force balance instrument so that the differential pressure in the liquid fuel between the first and second sensors is fed into the first force balance instrument. A third sensor 30 in the top of the fuel tank is connected through a line 32 to an input 34 of the first force balance instrument so that the instrument senses the liquid pressure head in the fuel. The force balance instrument 24 can be of any suitable type, such as the transducer sold by Wallace O. Leonard, Inc. of Pasadena, California as differential pressure ratio transducer type 502,500.

If desired, a source of helium gas 36 can be connected through a line 38 to a gas space 40 in the fuel tank above the liquid level of the fuel to maintain a constant gas pressure on the fuel in the tank.

The output of the first sensor 16 and that of the third sensor 30 is fed into a pair of inputs 42, 43, respectively, of a second force balance instrument 44, which may be of any suitable type, such as that sold by Wallace O. Leonard, Inc. as differential pressure ratio transducer type 502,280.

A second tank 46 is adapted to hold a supply of liquid oxygen 47 at a level 48 above a fourth sensor 49 connected through a line 50 to an input 51 on the second force balance instrument. A fifth sensor 52 in the top of the liquid oxygen tank is connected through a line 54 to an input 55 of the second force balance instrument so the instrument senses the pressure head of the liquid oxygen in the second tank. If desired, helium gas can be supplied from helium source 36 through a line 56 to the top of the liquid oxygen tank to maintain a constant gas pressure on the liquid oxygen in the tank.

Fuel flows from the fuel tank through a line 57 to a rocket engine (not shown) mounted on the missile. The flow of liquid oxygen from the bottom of the oxygen tank through a line 60 is controlled by a metering device 62.

The oxygen flows through its control valve to the rocket engine for combustion with the fuel.

The output of the first force balance instrument 24 is the ratio of the liquid pressure head of the fuel to the pressure difference existing in the fuel between the first and second sensors 16 and 26. Thus, the input to the first instrument 24 at inputs 20 and 29 is represented by the following equation: $\Delta P_{(K)} = d \cdot A \cdot K$, in which $d$ is density of the fuel, and $A$ is acceleration or gravity, and $K$ is the distance between the first and second sensors as shown in FIG. 1.

Likewise, the input to the instrument 24 at inputs 22 and 30 is represented by the following equation:

$$\Delta P_{\text{(Fuel Head)}} = d \cdot A \cdot H$$

Thus, the ratio of the two inputs is as follows:

$$\frac{\Delta P_{\text{(Fuel Head)}}}{\Delta P_{(K)}} = \frac{d \cdot A \cdot H}{d \cdot A \cdot K} = \frac{H}{K}$$

Thus, the effect of gravity and fuel density cancels out. Since $K$ is a known constant, the output of instrument 24 is a positive measurement of the fuel height in the tank 10 independent of variations in gravity or fuel density.

Figure 3:
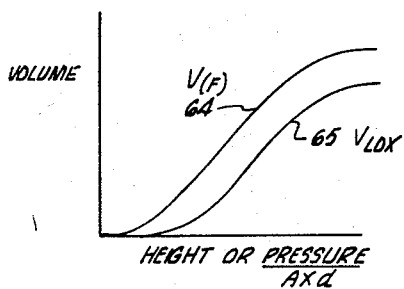
FIG. 3 is a hypothetical plot of how the volume of liquid in two tanks can vary with height of liquid in the tanks.

Referring to the hypothetical graph of FIG. 3, for purposes of explanation it is assumed that the volume of fuel ($V_F$) in the fuel tank varies with height as shown by curve 64. Similarly, the volume of liquid oxygen in its tank varies with height as shown by curve 65. The cross sectional shapes of the two tanks have been indicated schematically in FIG. 1 to be non-uniform cross section along their length to account for the non-linear function of volume vs. liquid height in each of the tanks. The curves 64 and 65 are obtained by suitable calibration, such as by filling the tanks with a measured volume of water and determining the corresponding liquid column height.

The output of the first force balance instrument is fed into a command signal computer and generator 66 which may be of conventional type and which is set to develop an output control signal that represents the desired ratio of the pressure head of the liquid oxygen to the pressure head of the fuel for the particular signal from the force balance instrument 24. The command signal is fed into an error signal generator 67, which may be of conventional type. The error signal generator also receives the output of the second force balance, which is the actual ratio of the pressure head of the liquid oxygen to the pressure head of the fuel. Any variation of the actual pressure ratio from the desired ratio set by the command signal develops an error signal which is amplified by an amplifier 68 and applied to metering device 62 to bring the actual ratio of the pressure heads of the two liquids back to the desired value.

When the missile is fired, metering device 62 is set so the desired ratio of oxygen and fuel flows to the rocket engine. As the liquid head in the fuel tank drops, its height is accurately determined independent of acceleration and fuel density by the first force balance instrument 24. The amount of fuel remaining in the tank is known from previously obtained calibration (as represented by curve 64 in FIG. 3). For any given amount of remaining fuel there should be a fixed amount of remaining oxygen to maintain the desired ratio of oxygen to fuel. The calibration data of FIG. 3 is used by the computer and command signal generator 66 to develop a signal indicative of the proper ratio of oxygen head to fuel head for the instantaneous height of the fuel. If the liquid oxygen should be delivered at a lower rate than intended, for example, due to icing of the interior of the delivery lines, the actual ratio of liquid oxygen pressure head to fuel pressure head rises above the desired value. This generates an error signal which further opens the metering device. Of course, a plurality of such devices connected in a bypass arrangement can be used. As soon as the ratio of oxygen to fuel is brought back to the desired value, the error signal is zero and the metering device is returned to its proper setting.

As the fuel level in the fuel tank falls, the output of the first force balance instrument changes accordingly to deliver an output proportional to the liquid height in the fuel tank. This in turn causes the computer to generate a varying command signal in accordance with the functions expressed by the curves of FIG. 3. By knowing the variation of the volume of liquid oxygen with its depth in its respective tank, it is a routine matter to set the computer 66 to deliver an output of the desired ratio of the pressure heads as the liquid fuel level changes. Of course, the command signal could be derived from the liquid oxygen tank instead of the fuel tank. Thus, even though the volume of remaining fuel and oxygen may vary non-linearly with fuel depth in the tank, the computer output is varied accordingly to call for the desired ratio of the pressure heads of the fuel and oxygen.

Figure 2:
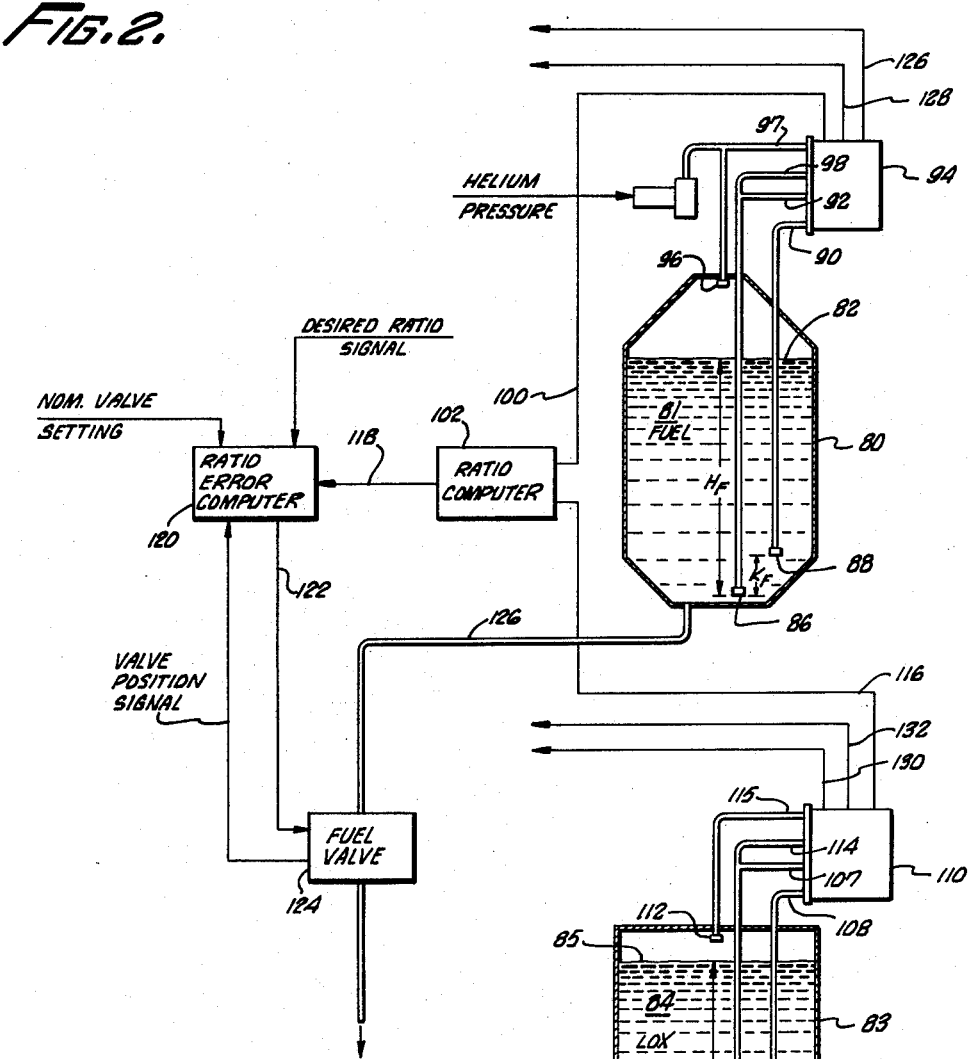
FIG. 2 is a schematic diagram of another form of the invention.

In the alternate embodiment of the invention shown in FIG. 2, a fuel tank 80 holds liquid fuel 81 at a level 82, and a liquid oxygen tank 83 holds liquid oxygen 84 at a level 85. A sensor 86 is disposed a distance $H_F$ below the level of the fuel and a sensor 88 is disposed in the fuel at a distance $K_F$ above sensor 86. Sensors 86 and 88 are connected to a pair of inputs 90 and 92 of a force balance instrument 94. A sensor 96 in the top of the fuel tank and sensor 86 are connected to a pair of inputs 97, 98 of the force balance instrument 94. Instrument 94 senses the quantity of the ratio of the fuel pressure head to the pressure difference between sensors 86 and 88, which is $H_F/K_F$. The output is non-linear to match the non-linearity shown in curve 64 of FIG. 3, thereby providing an output proportional to fuel volume and substantially independent of acceleration and density. The fuel volume output is fed by a lead wire 100 into a ratio computer 102.

A sensor 104 in the bottom of the liquid oxygen tank at a distance $H_O$ below the oxygen liquid surface and a sensor 106 at a distance $K_O$ above the sensor 104 are connected to a pair of inputs 107, 108, respectively, of a force balance instrument 110. Both force balance instruments 94 and 110 may be of conventional type, such as that sold by Wallace O. Leonard, Inc. as transducer type 502,500. The sensor 104 and the sensor 112 in the top of the liquid oxygen tank are connected to a pair of inputs 114, 115, respectively, so that the instrument 110 senses the ratio of the liquid oxygen pressure head to the pressure difference between sensors 104 and 106. As with the fuel, this ratio is proportional to the volume of the liquid oxygen in the tank, and a signal proportional to this value is transmitted through a lead wire 116 to the ratio computer, which computes the true mass ratio of the fuel and oxygen masses, and passes this information through a lead wire 118 to a ratio error computer 120. The desired ratio of fuel volume to oxygen volume may be preset into the ratio error computer, or a variable desired volume ratio may be inserted based on time prediction, liquid head prediction, or upon actual ancillary equipment measurements. This variable volume ratio would be caused by fuel and oxidizer density variations during flight. The ratio error computer develops an error signal which is the difference between the true volume ratio and the desired ratio. The output of the error computer is fed through a signal line 122 to control a metering device 124 to regulate the flow of fuel, oxidizer, or both to maintain the desired volume ratio.

The instrument 94 also has a fuel head signal output line 126 which is used to fill the tank to the desired level prior to flight of the missile. A telemetering signal output line 128 on the instrument 94 transmits a signal to indicate the instantaneous depth of fuel while the missile is in flight. Likewise, the instrument 110 has an oxygen head tanking signal output line 130 and a telemetering signal output line 132.

We claim:
1. Apparatus for controlling the ratio of the quantities of two liquids present in a system, the apparatus comprising a first tank adapted to hold a first liquid, means for discharging liquid from the first tank, a second tank adapted to hold a second liquid, means for discharging liquid from the second tank, means for regulating the rate at which liquid discharges from one of the tanks, means for sensing the difference in pressures of one of the liquids acting at a first pair of predetermined points of measurement within the said one liquid, means for sensing the difference in pressures between a point above the surface of the said one liquid and of the said one liquid acting at a predetermined point of measurement within the said one liquid, means for developing a command signal in response to the ratio of the two said differences in pressures, means for sensing the ratio of the liquid heads in the two tanks, means for developing an error signal in response to the command signal and the ratio of the two liquid heads, and means responsive to the error signal for adjusting the regulating means to control liquid discharged from the said one tank.

2. Apparatus for controlling the ratio of the quantities of two liquids in a system, the apparatus comprising a first tank adapted to hold a first liquid, means for discharging liquid from the first tank, a second tank adapted to hold a second liquid, means for discharging liquid from the second tank, means for regulating the rate at which liquid discharges from one of the tanks, means for sensing the difference in pressures of the first liquid acting at a pair of predetermined points of measurement within the first liquid, means for sensing the difference in pressures between a point above the surface of the first liquid and of the first liquid acting at a predetermined point of measurement within the first liquid, means for developing a first signal proportional to the ratio of the two said differences in pressures in the first liquid to indicate the height of the liquid in the first tank, means for sensing the difference in pressures of the second liquid acting at a pair of predetermined points of measurement within the second liquid, means for sensing the difference in pressures between a point above the surface of the second liquid and of the second liquid acting at a predetermined point of measurement within the second liquid, means for developing a second signal proportional to the ratio of the two said differences in pressures in the second liquid to indicate the height of the liquid in the second tank, means for developing a third signal in response to the ratio of the first and second signals, means for developing an error signal from the third signal, and means responsive to the error signal for adjusting the regulating means to control liquid discharged from the said one tank.

References Cited in the file of this patent

UNITED STATES PATENTS

| | | |
|---|---|---|
| 2,509,629 | De Giers et al. | May 30, 1950 |
| 2,521,477 | Pellettere | Sept. 5, 1950 |
| 2,687,168 | Haviland | Aug. 24, 1954 |
| 2,860,651 | Davies | Nov. 18, 1958 |
| 2,860,652 | Badger | Nov. 18, 1958 |
| 3,038,336 | Peters | June 12, 1962 |